United States Patent [19]
Jung et al.

[11] Patent Number: 5,221,039
[45] Date of Patent: Jun. 22, 1993

[54] LIQUID PHASE DIFFUSION BONDING USING HIGH DIFFUSIVITY ELEMENT AS INSERT MATERIAL

[75] Inventors: Jae P. Jung; Bo Y. Lee, both of Daejeon; Choon S. Kang, Seoul, all of Rep. of Korea

[73] Assignee: Korean Institute of Machinery and Metals, Changwon, Rep. of Korea

[21] Appl. No.: 695,124

[22] Filed: May 3, 1991

[30] Foreign Application Priority Data

Jun. 28, 1990 [KR] Rep. of Korea .................. 9669/1990
Feb. 28, 1991 [KR] Rep. of Korea .................. 3323/1991

[51] Int. Cl.$^5$ .................. B23K 28/00; B23K 103/00
[52] U.S. Cl. .................. 228/195; 228/194; 228/263.13
[58] Field of Search .................. 228/194, 195, 263.13, 228/263.15

[56] References Cited

U.S. PATENT DOCUMENTS

| | | | |
|---|---|---|---|
| 3,088,192 | 5/1963 | Turner | 228/263.13 |
| 3,530,568 | 9/1970 | Owczarski | 228/194 |
| 3,708,866 | 1/1973 | Wells | 228/194 |
| 4,691,856 | 9/1987 | Haramaki et al. | 228/194 |

Primary Examiner—Richard K. Seidel
Assistant Examiner—Jeffrey T. Knapp
Attorney, Agent, or Firm—Armstrong, Westerman, Hattori, McLeland & Naughton

[57] ABSTRACT

A liquid phase diffusion bonding method using an insert material such as B,C,Si and Hf having a high diffusivity and a melting point higher than that of the base metal is disclosed. During the bonding, the insert material is not melted, but the insert material and the base metal are reacted with each other in such a manner that the diffusion bonding can be carried out under a non-oxidizing atmosphere at a temperature lower than the melting point of the insert material.

4 Claims, 4 Drawing Sheets

| | PRIOR ART | | PRESENT INVENTION |
|---|---|---|---|
| | TLP METHOD | HIGH ENERGY BEAM METHOD | BORON PACKING METHOD | |
| U.S. PAT. No | 3678570 | 4691856 | |
| BONDING MECHANISM | | 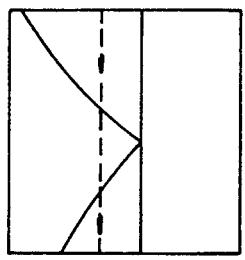 | 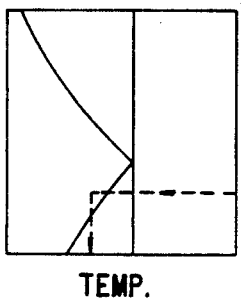 |
| MELTING POINT OF INSERT | LESS THAN MELTING POINT OF THE BASE METAL | | HIGHER THAN MELTING POINT OF THE BASE METAL |
| MELTING OR NON-MELTING OF INSERT MATERIAL DURING BONDING | MELTING | | NOT MELTING |
| INSERT MATERIAL | BRAZING FOIL | ALLOYED LAYER ON THE BONDING SURFACE | BORON FOIL OR POWDER (EX. B FOIL/POWDER) |

| INSERT MATERIAL INSERT METHOD | USUALLY CARRIED OUT UNDER THE NORMAL TEMPERATURE ATMOSPHERE | BONDING SURFACE IS COATED BY MEANS OF A LASER AND THE LIKE UNDER A NON-OXIDIZING ATMOSPHERE | BONDING SURFACE IS COATED BY USING PACKING POWDERS AT A TEMPERATURE OF 700-850°C | CAN BE CARRIED OUT UNDER THE NORMAL TEMPERATURE ATMOSPHERE |
|---|---|---|---|---|
| BONDING TEMPERATURE | MELTING PT. OF INSERT < BONDING TEMP. < MELTING PT. OF BASE METAL | | | BENDING TEMP. < MELTING PT. OF BASE METAL < MELTING PT. OF INSERT |
| BONDING TIME (INCLUDING HOMOGENIZATION TIME) | MAX. 100 HRS. | GENERALLY 1 HR. | GENERALLY 20 HRS | 1 HR. |

FIG.2b

FIG. 3
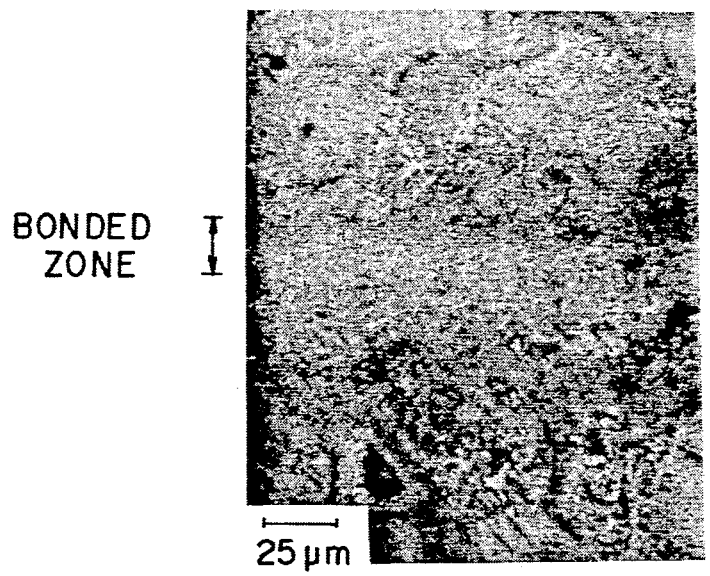
BONDED ZONE
25 μm
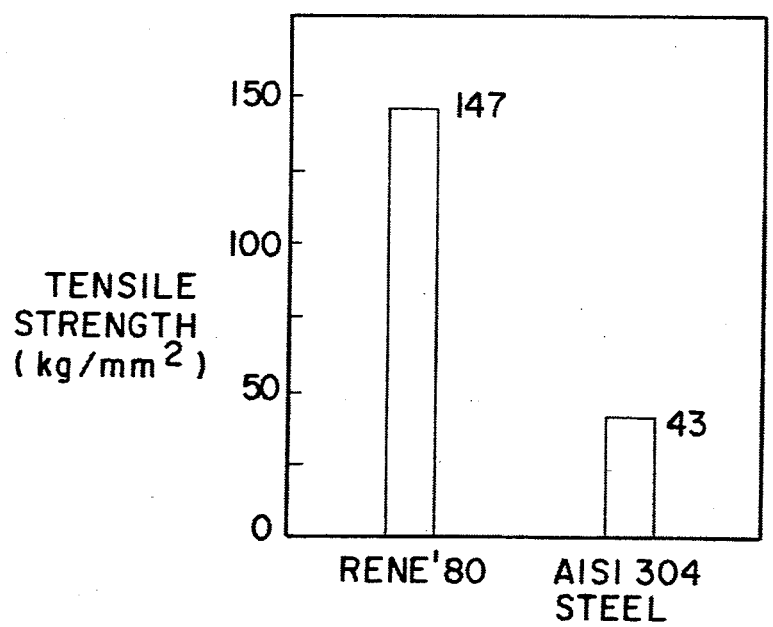
FIG. 4

LIQUID PHASE DIFFUSION BONDING USING HIGH DIFFUSIVITY ELEMENT AS INSERT MATERIAL

FIELD OF THE INVENTION

The present invention relates to a diffusion bonding method for use in the bonding of gas turbine blades and nozzles, and to the bonding of Fe-base alloys and nonferrous alloys, in which a transient liquid phase bonding method (to be called hereinafter "TLP") for heat resistant super alloys is applied. In contrast to the existing method, the insert materials used according to the present invention have the characteristics that their diffusivity is high and their melting points are higher than those of the base metal.

BACKGROUND OF THE INVENTION

The TLP bonding method has been developed since the 1970s in order to improve the bonding strength of heat resistant super alloys (U.S. Pat. No. 3,678,570). The existing TLP bonding method is carried out in such a manner that an insert material is inserted into between two base metals to be bonded, and then, it is held for a long time at a temperature (i.e., at the bonding temperature), higher than the melting point of the insert material, so that the insert material in liquid phase is isothermally solidified, thereby bonding the two base metals. According to this bonding method, there is almost no distinction between the base metals and the bonding zone thereby improving the bonding strength greatly.

The existing TLP bonding method consists of: a step of melting the insert material, melting the base metals, isothermal solidification, and homogenizing the bonding zone and the base metals. The most important factor affecting the bonding process is the insert material, and there have been many much efforts to develop superior insert materials. The existing bonding method uses insert materials in the form of alloy powders, alloy films and an alloy layer on the bonding surface, which contain lower diffusivity elements and melt at the bonding temperature.

The TLP bonding method (U.S. Pat. No. 4,122,992) developed by Duvall et al, uses a brazing foil and requires a long time (e.g. reportedly up to 100 hours) at a high temperature for the homogenization of the bonding zone and the base metals. This causes a lower productivity, and the deterioration of the base metals.

Meanwhile, the high energy beam method (U.S. Pat. No. 4,691,856) and the boron packing method, in both of which an alloy layer is formed on the bonding surface, involve the problems of forming the alloy layer in a high temperature vacuum or in an inert gas atmosphere.

SUMMARY OF THE INVENTION

It is an object of the present invention to provide a liquid phase diffusion bonding in which an insert materials (such as B,C,Si and Hf sheets or powders) having high diffusivities and melting points higher than those of the base metal have only to be inserted into the bonding joint at atmospheric pressure and at the room temperature, thereby simplifying the process.

It is another object of the present invention to provide a liquid phase diffusion bonding in which the bonding mechanism is different from that of existing methods, in such a manner that, while the insert material is melted at the bonding temperature according to the existing method, the insert materials according to the present invention such as B,C,Si and Hf are not melted at all at the bonding temperature, but only the portions of the base metals reacted to the insert material are melted.

It is still another object of the present invention to provide a liquid phase diffusion bonding method in which the bonding time (including the time for the homogenization) is greatly shortened (to about 1 hour) compared with the existing TLP bonding method due to the use of high diffusivity insert materials.

The present invention is a liquid phase diffusion bonding method for bonding super-alloys, Fe-base alloys and nonferrous alloys, and is capable of homogenizing the bonding zone and the base metals within a short period of time.

Further, diffusivity of the insert material (such B,C,Si and Hf) is very high and the base metals themselves are solidified after melting, and therefore, there is no need for a homogenization treatment after isothermal solidification with the result that the bonding time is greatly shortened compared with the conventional TLP bonding method.

BRIEF DESCRIPTION OF THE DRAWINGS

The above objects and other advantages of the present invention will become more apparent by describing in detail the preferred embodiment of the present invention with reference to the attached drawings in which:

FIGS. 2, 2a, and 2b illustrate the differences between the overall characteristics of the present invention and that of the conventional TLP bonding method;

FIG. 3 is a photographical illustration showing the microstructure of the cross section of the bonded zone for the case where the bonding is carried out by using René 80 as the base metal.

FIG. 4 is a graphical illustration showing the tensile strengths of the bonded joint for the case where René 80 and AISI 304 stainless steel are used as the base metals.

DESCRIPTION OF THE PREFERRED EMBODIMENT

Figure 1:
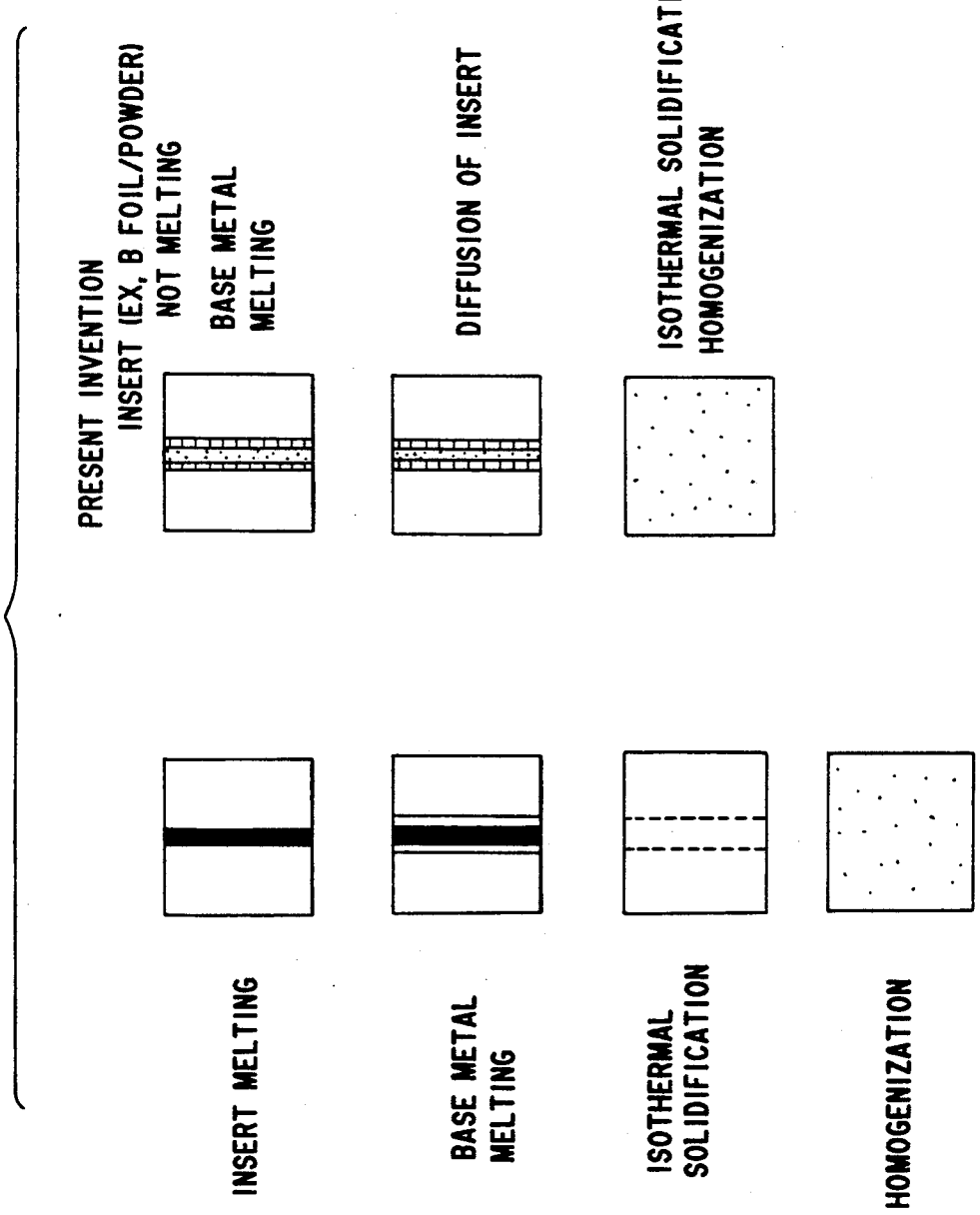
FIG. 1 illustrates the difference between the bonding process of the present invention and that of the conventional TLP bonding method.

FIG. 1 illustrates a comparison between a conventional bonding process and the bonding process of the present invention. According to the present invention, in contrast to a conventional TLP process only base metal is melted at the bonding temperature, and the melting of the base metals and the isothermal solidification occur during the homogenizing process of boron. According to U.S. Pat. No. 4,691,856 in which an alloy layer is formed on the bonding faces by means of high energy beams, some of the elements are evaporated from the base metal, thereby requiring a lengthy time for the homogenization.

According to the present invention, however, the bonding process is carried out under atmospheric pressure and ambient temperature, with the result that elements are not lost from the base metals, and the homogenization is achieved simultaneously with the isothermal solidification. FIGS. 2, 2a, and 2b illustrates a summary of the differences between the present invention on the one hand and the conventional TLP method, the high energy beam method, and the boron packing method on the other hand.

The high energy beam method has disadvantages in that a laser has to be used under a vacuum or an inert gas atmosphere, and some elements are evaporated from base metal during high energy beam treatment.

Secondly, is reported that the boron packing method requires a treatment at a high temperature (e.g., 700°-850° C.) for a long time (e.g., 3.5 hours), and also requires about 20 hours for achieving the homogenization during the bonding.

According to the present invention, however, a high melting point high diffusivity element has only to be inserted into the bonding zone at room temperature atmospheric pressure, and therefore, there is no need for heating the base metals to a high temperature prior to carrying out the bonding, and no need for the time for forming an alloy layer. Further, there is no element loss from the base metals which is liable to occur during a high temperature treatment, and therefore, the homogenization is achieved simultaneously with the isothermal solidification.

Thirdly, for the present invention a high diffusivity insert element such as boron has only to be diffused, and therefore, the bonding time (including the time for the homogenization) is only 1 hour, thereby making it possible to reduce the deterioration of the materials and to improve the productivity greatly.

EXAMPLE

Pieces to be bonded were sufficiently polished, and washed with acetone. The washed pieces were dried, and then, a high melting point high diffusivity insert material (e.g., boron sheet) was inserted between the pieces to be bonded.

Here, instead of the boron sheet, boron powders can be used, and when boron powders are used, the boron powders and alcohol are mixed as a solution, and doped on the bonding surface. After the alcohol is evaporated from the doped surface, a boron film will remain on the bonding surface. Such a procedure is carried out under room temperature and atmospheric pressure.

For the bonding, the pieces with the insert material were held under a vacuum of below $10^{-4}$ torr at a temperature of 1150°-1250° C. for about 1 hour for the case of a Ni-base super alloy (e.g., René 80) or a stainless steel (e.g., AISI 304). FIG. 3 is a picture showing the microstructure of the cross section of the bonded zone for the case where René 80 was used as the base metal, boron powders as the insert material, and held for 1 hr at 1600° C. FIG. 4 shows the tensile strengths of René 80 and AISI 304 stainless steel in the case where boron powders were used as the insert material.

What is claimed is:

1. A liquid phase diffusion bonding method consisting of providing an insert of a material of an element selected from the group consisting essentially of boron, carbon, hafnium and silicon, or mixtures thereof, having a melting point higher than the melting point of a base metal to which said insert is to be bonded; and heating said insert and base metal such that diffusion occurs therebetween, under a non-oxidizing atmosphere at a temperature less than the melting point of said insert; whereby said insert material is not melted but said insert material and base metal are dissolved together.

2. The liquid phase diffusion bonding method as defined in claim 1, wherein said base metal is a super alloy containing a material selected from the group consisting essentially of nickel, cobalt, iron, titanium, an Fe-base alloy and a nonferrous alloy.

3. The liquid phase diffusion bonding method as claimed in claim 1 wherein the bonding temperature to which said insert and base metals are heated in less than the melting points of said base metal and said insert.

4. The liquid phase diffusion bonding method as defined in claim 1, wherein the purity of said insert is greater than 95%.

* * * * *